United States Patent [19]

Tamaki et al.

[11] Patent Number: 5,473,232
[45] Date of Patent: Dec. 5, 1995

[54] SENSORLESS BRUSHLESS MOTOR DRIVING APPARATUS WITH INDUCED VOLTAGE SIGNAL LATCH

[75] Inventors: Satoshi Tamaki; Yasuhiro Kondo, both of Hirakata, Japan

[73] Assignee: Matsushita Electric Industrial Co., Ltd., Osaka, Japan

[21] Appl. No.: 156,597

[22] Filed: Nov. 23, 1993

[30] Foreign Application Priority Data

Feb. 24, 1993 [JP] Japan ................................ 5-035045

[51] Int. Cl.6 .................................................. H02P 7/00
[52] U.S. Cl. ................................... 318/439; 318/254
[58] Field of Search .................................. 318/254, 138, 318/439, 798–815

[56] References Cited

U.S. PATENT DOCUMENTS

| 4,712,050 | 12/1987 | Nagasawa et al. | 318/254 |
|---|---|---|---|
| 4,743,815 | 5/1988 | Gee et al. | 318/254 |
| 4,780,651 | 10/1988 | Nakano et al. | 318/254 |
| 4,900,993 | 2/1990 | Yasohara et al. | 318/254 |
| 4,928,043 | 5/1990 | Plunkett | 318/254 |
| 5,182,499 | 1/1993 | Inaji et al. | 318/254 |
| 5,221,881 | 6/1993 | Cameron | 318/254 |
| 5,223,772 | 6/1993 | Carobolante | 318/254 |
| 5,343,127 | 8/1994 | Maiocchi | 318/254 |

*Primary Examiner*—Jonathan Wysocki
*Attorney, Agent, or Firm*—Panitch Schwarze Jacobs & Nadel

[57] ABSTRACT

In a driving apparatus for a sensorless brushless motor, changing-over of excitation is executed at every electric angle of 30° from a trigger point defined by a signal obtained by latching an induced voltage at the time of fall-down of the pulse-width modulation signal.

4 Claims, 9 Drawing Sheets

SENSORLESS BRUSHLESS MOTOR DRIVING APPARATUS WITH INDUCED VOLTAGE SIGNAL LATCH

FIELD OF THE INVENTION AND RELATED ART STATEMENT

1. Field of the Invention

The present invention relates to a driving apparatus for driving and controlling a brushless motor without a position sensor which is used in domestic electric equipments to drive a fan or a pump.

2. Description of the Related Art

In recent years, electrical equipments for domestic use etc. have been improved to have a long lifetime and a high reliability. For example, employment of a brushless motor has been increased.

There is a request that the motor should be driven at any speed in response to a speed control command. To comply with this request, such a method is generally used that an exciting voltage for the motor is changed by modulating a pulse width of the exciting voltage.

FIG. 9 is a block diagram showing the conventional driving system. An encoder 22, which is coupled with a rotor of a three-phase brushless motor 21, issues a rotational speed signal in response to a rotational speed of the rotor. An F/V (frequency/voltage) converter 23 converts the rotational speed signal into a voltage signal. This voltage signal corresponds to a real rotational speed of the brushless motor 21. A speed control command signal and the voltage signal of the F/V converter 23 are compared with each other at a comparator 24, and a resultant signal is supplied to a pulse-width modulator 25. An exciting voltage of the brushless motor 21 is controlled in response to an output from the pulse-width modulator 25 so that the brushless motor 21 can be rotated at a rotational speed synchronous with a rotational speed specified by the speed control command signal. A driver 27 supplies the brushless motor 21 with a current in accordance with an output of a driving logic generator 26.

However, in the above-mentioned driving system For the motor, it is necessary to provide the motor with rotational speed detecting devices such as the encoder 22 etc. Therefore, size of the motor unavoidably becomes large, thereby resulting in increase of costs. Besides, the motor having the encoder etc. can not be located in such a severe environment that electronic components in the encoder etc. are disabled by high temperature, vibration or pressure.

OBJECT AND SUMMARY OF THE INVENTION

An object of the present invention is to offer a driving apparatus for a sensorless brushless motor without any rotational speed detection device such as an encoder and any position sensor for a rotor.

In order to achieve the above-mentioned object, the present invention comprises:

drive means for driving the motor in accordance with an excitation signal issued from a microprocessor;

speed control means for controlling a speed of the motor by modulating a pulse-width of the excitation signal;

latch means for latching an induced voltage appearing on a coil of the motor in comparison with a neutral point voltage of the motor in synchronism with a pulse-width modulation signal issued from the microprocessor; and correction means for correcting an excitation time period of the excitation signal by referring to a signal latched by the latch means.

According to the present invention, it is possible to accurately detect a reference point at which the induced voltage crosses the neutral point voltage without having any influence by the pulse-width modulation signal. The motor is driven by the excitation signal corresponding to a predetermined angle (e.g., 30°), and a stable rotation is obtained by making a phase-locking control.

Further, a rotational speed synchronous with a speed control command can be obtained by varying a duty of the pulse-width modulation signal with reference to a result of comparison between the speed control command signal and an average of the excitation time periods.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, a preferred embodiment of the present invention will be described with reference to the accompanying drawings.

Description of the Circuitry

Figure 1:
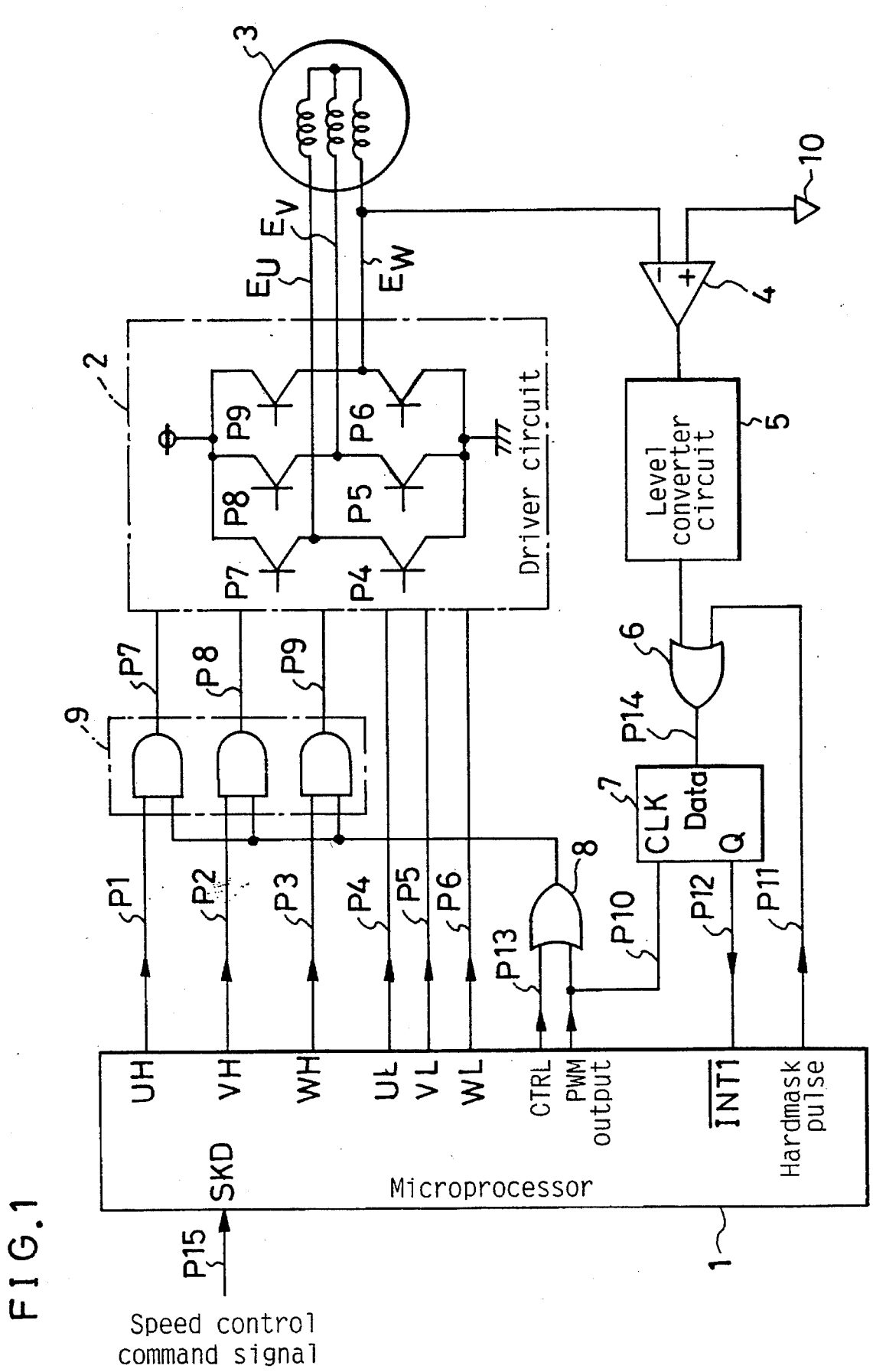
FIG. 1 is a circuit diagram showing a driving apparatus for a sensorless brushless motor in the present invention.

FIG. 1 is a block diagram showing a driving apparatus for a sensorless brushless motor. A microprocessor 1 controls the timing for changing over excitation of respective coils, and issues excitation signals P1–P6 for the respective coils. The microprocessor 1 supplies an OR gate circuit 8 and a latch circuit 7 with a pulse width modulation signal P10. The microprocessor 1 gets information concerning the phase of a rotor from an induced voltage. Further, the microprocessor 1 corrects an excitation time period in a manner that there may be no phase difference between a position of the rotor and a time for electrifying the coil, and the microprocessor 1 decides a duty of the pulse-width modulation signal so that the rotor may be rotated at a speed synchronous with a speed control command signal P15. A driver 2 changes over the excitation of the respective coils. A brushless motor 3 having three-phase windings is driven by a three-phase full-wave driving method.

A comparator 4 compares a voltage induced on a specific one of excitation coils of the motor 3 with a neutral point voltage of the motor 3. A level converter circuit 5 converts an output voltage level of the comparator 4 into a certain level. An OR gate circuit 6 takes an OR logic of an output of the level converter circuit 5 and an output P11 of the microprocessor 1. The latch circuit 7 latches an induced voltage waveform in synchronism with the pulse-width modulation signal P10. The OR gate circuit 8 for the pulse-width modulation control serves to make a selection whether the speed control is necessary or not. An AND gate circuit 9 serves to control the excitation voltage in response to an output signal issued from the OR gate circuit 8. A terminal 10 is supplied with the neutral point voltage of the motor or a reference voltage equivalent to the neutral point voltage.

Figure 8:
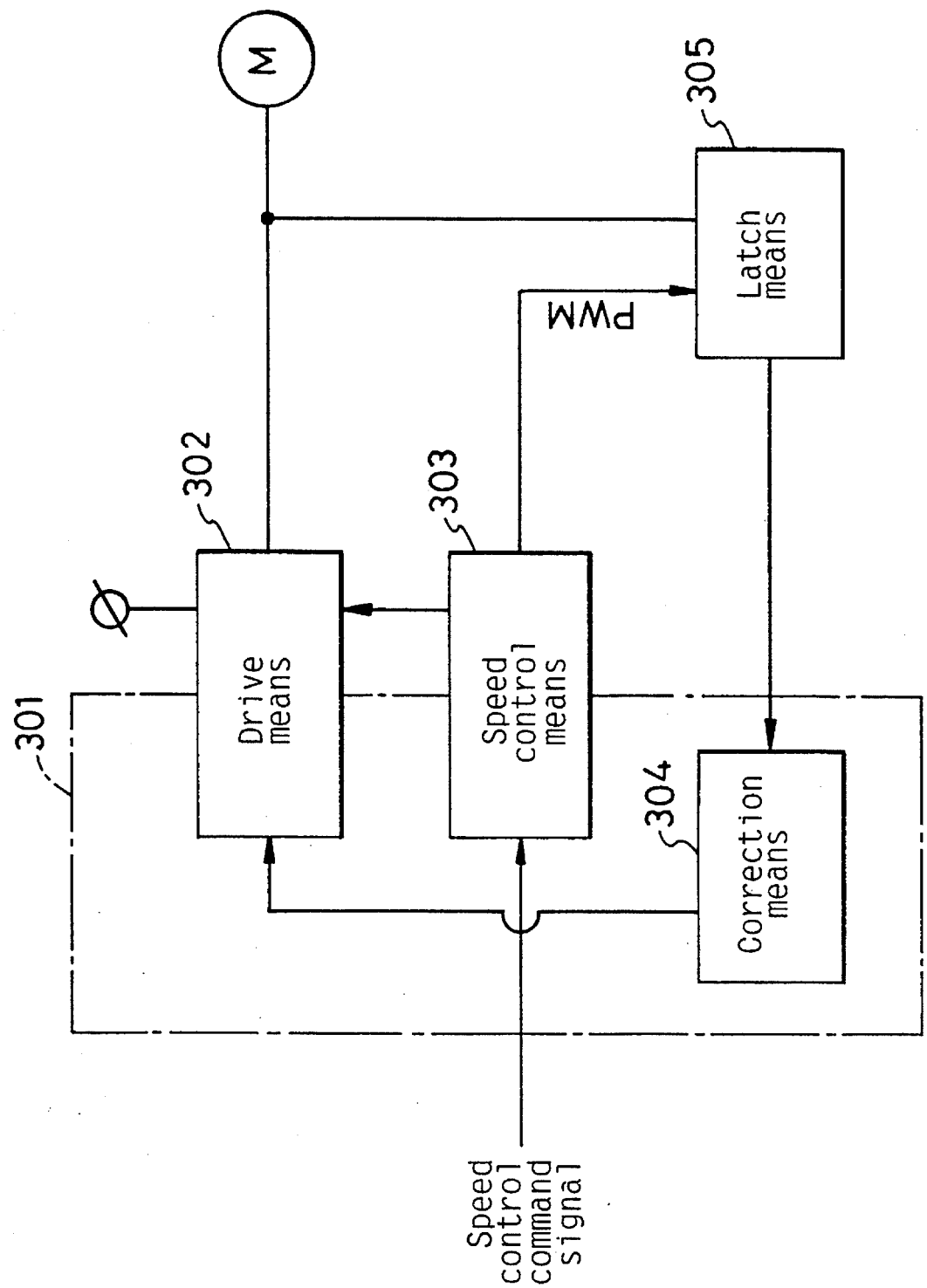
FIG. 8 is a block diagram showing a conception of the driving apparatus in the present invention.
Figure 9:
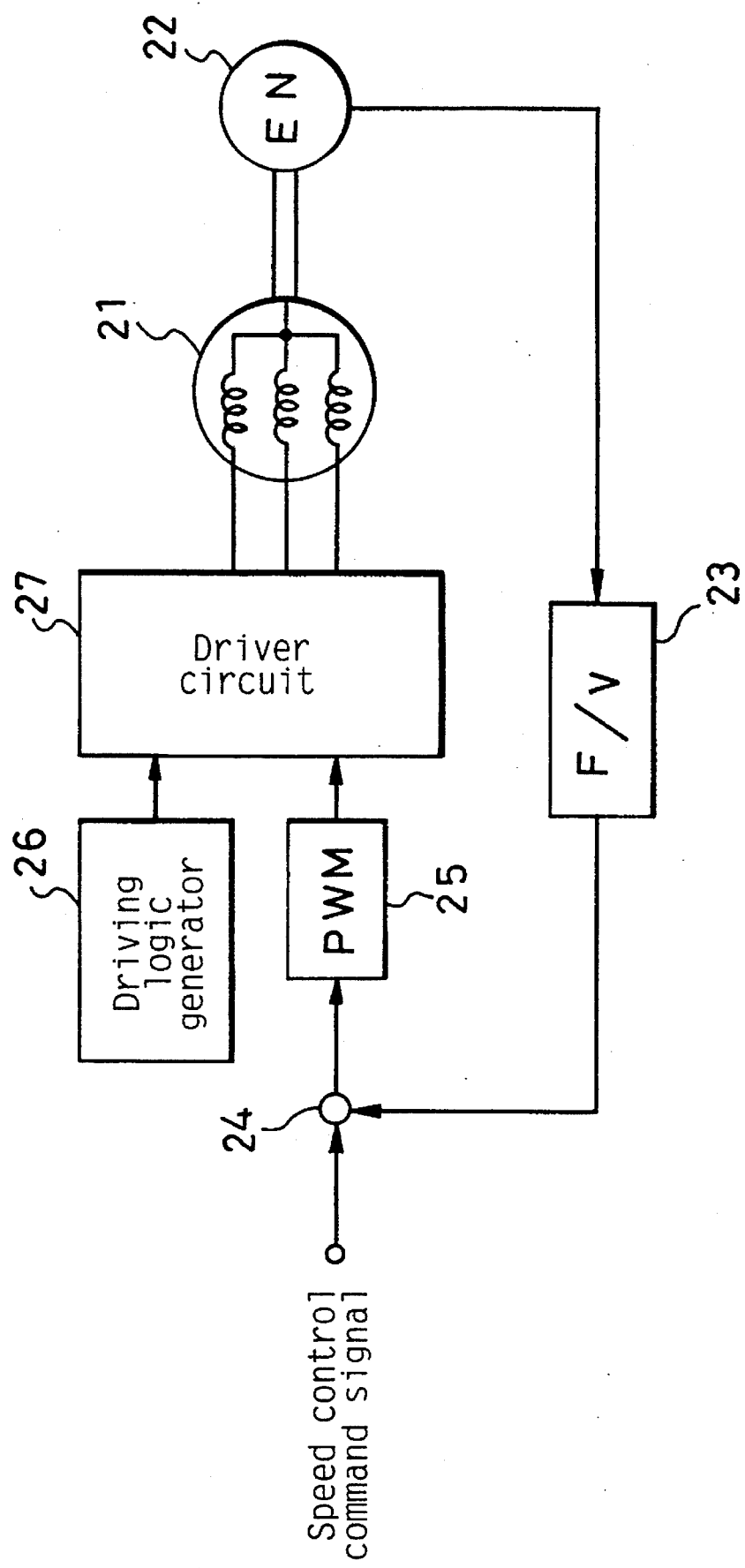
FIG. 9 is a block diagram showing the conventional driving system.

FIG. 8 is a reference block diagram showing a conception of the above-mentioned circuit structure. Correspondence of components in FIG. 1 to blocks in FIG. 8 is as follows:

The microprocessor 1 and the driver circuit 2 constitute drive means 302 for driving the motor 3. The microprocessor 1, the OR gate circuit 8 and the AND gate circuit 9 constitute speed control means 303 for controlling a speed of the motor 3. The comparator 4, the level converter circuit 5, the OR gate circuit 6 and the latch circuit 7 constitute latch means 305 for latching an induced voltage appearing on a coil of the motor 3. The microprocessor 1 also acts as correction means 304 for correcting an excitation time period of the excitation signal.

Figure 2:
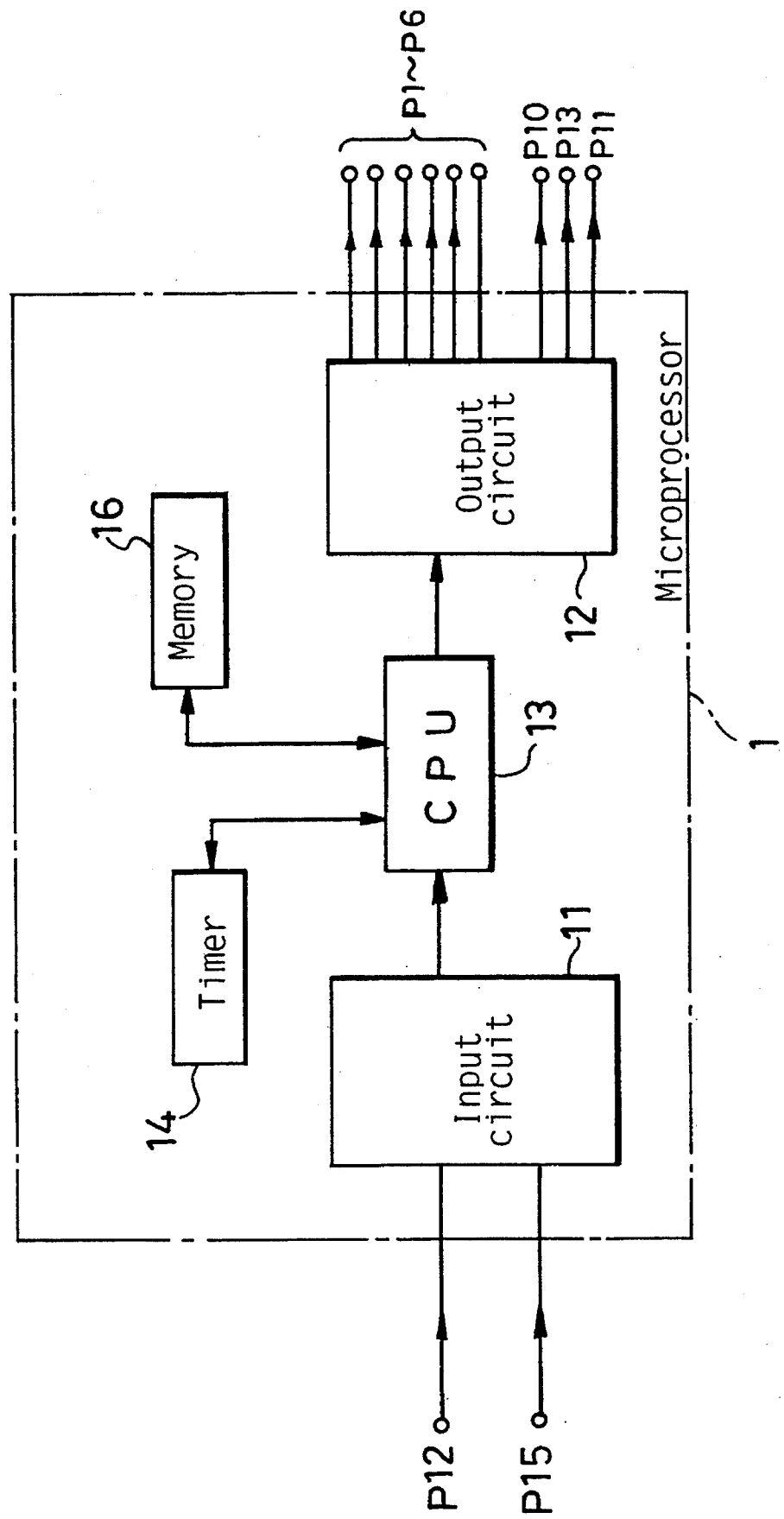
FIG. 2 is a block diagram showing an internal structure of a microprocessor 1 shown in FIG. 1.

FIG. 2 is a block diagram showing an internal circuit of the microprocessor 1 usable in the present invention. An output signal P12 of the latch circuit 7 (FIG. 1) and the speed control command signal P15 are input to a central processing unit (hereinafter is referred to as a CPU) 13 by way of an input circuit 11. The CPU 13 is connected to a timer 14 and a memory 16. Output signals of the CPU 13 are issued by way of an output circuit 12. The signals P1–P6 are supplied to the driver circuit 2 (FIG. 1). The signal P11, the pulse-width modulation signal P10 and the signal P13 for making speed control are supplied to the OR gate circuits 6 and 8 (FIG. 1).

Description of the General Operation

Figure 4:
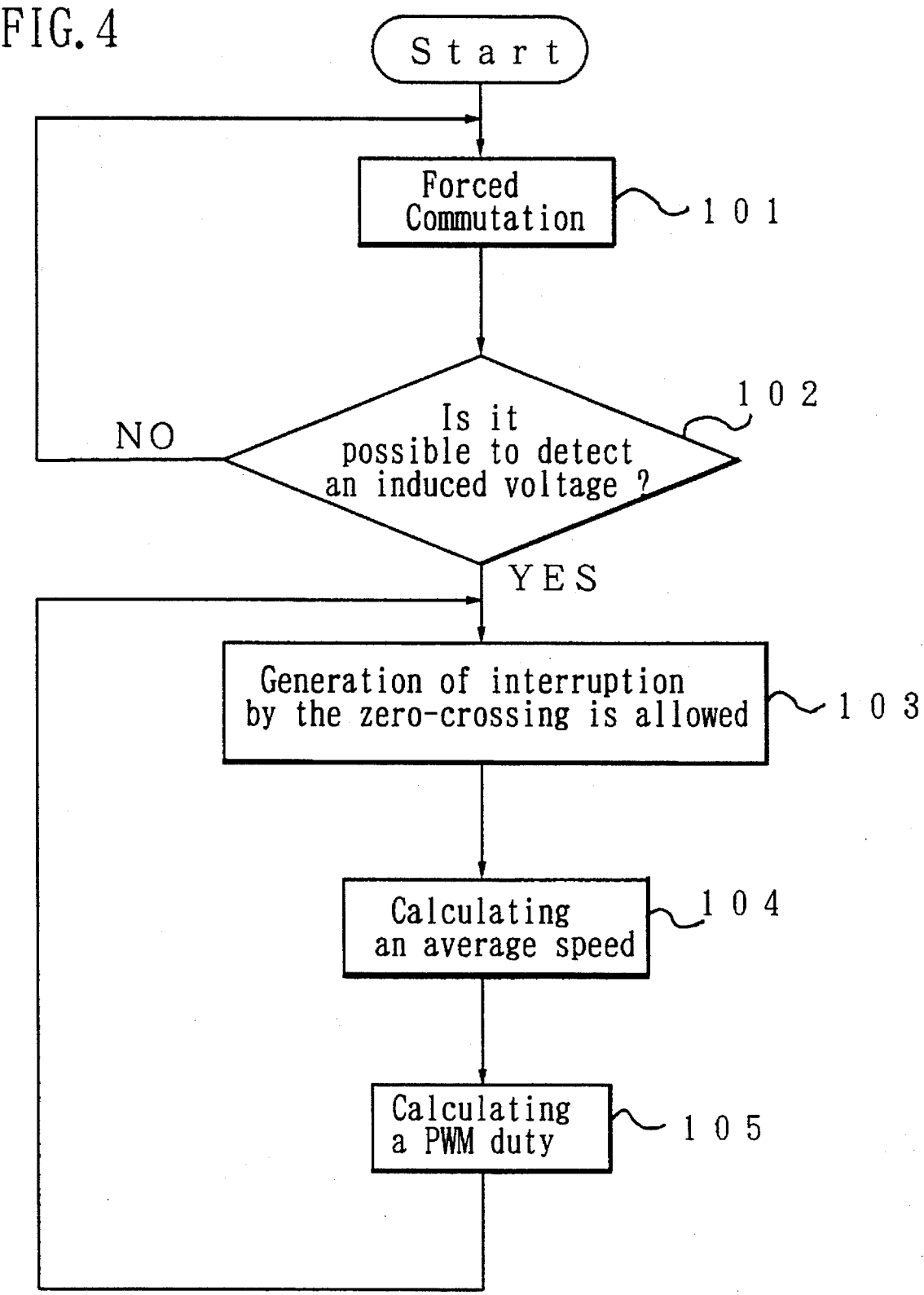
FIG. 4 is a flow chart showing a main routine executed in the microprocessor 1.
Figure 5:
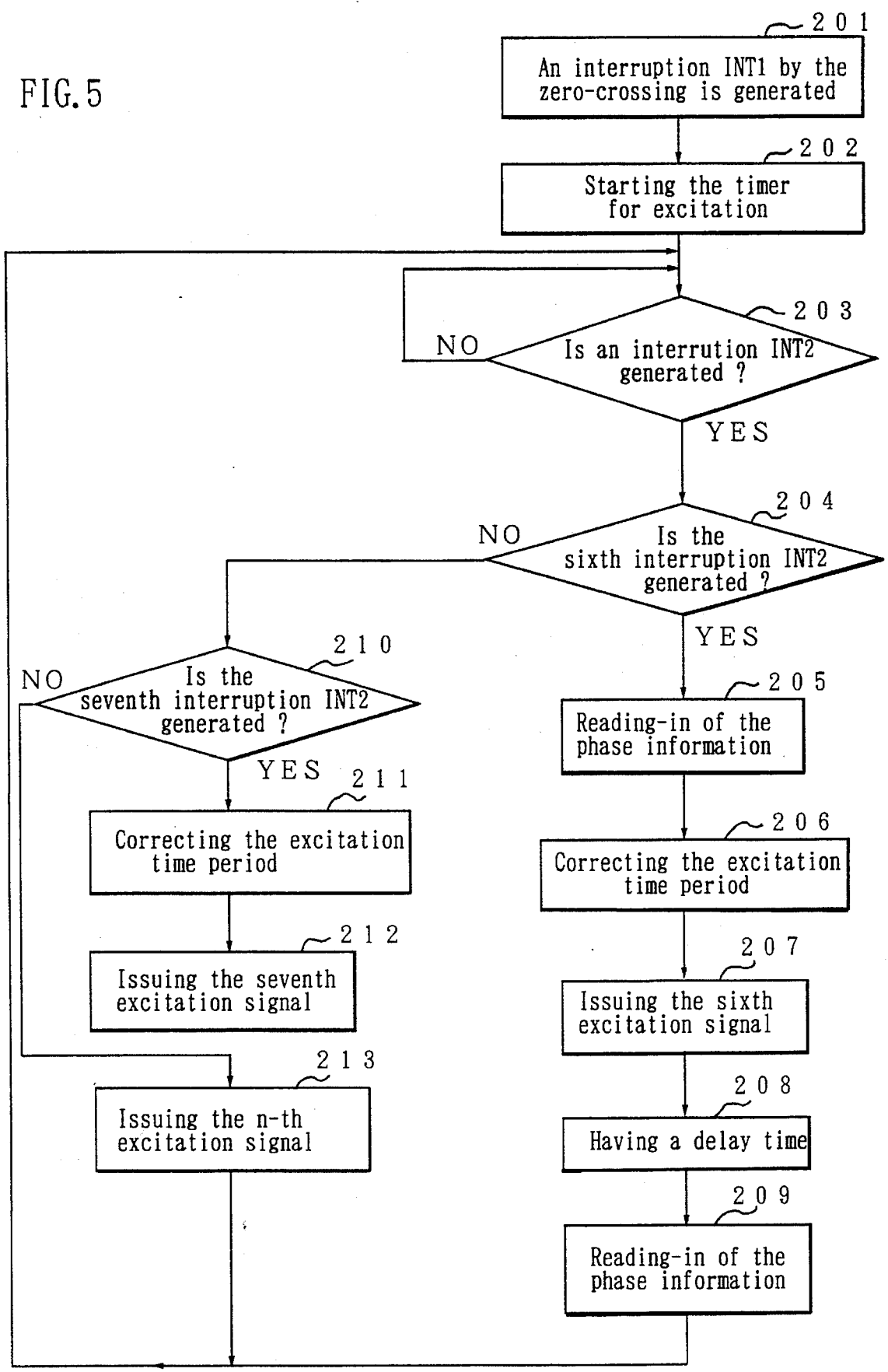
FIG. 5 is a flow chart showing an interruption routine executed in the microprocessor 1.

Hereafter, operation of the driving apparatus for the sensorless brushless motor will be described with reference to flow charts shown in FIG. 4 and FIG. 5 which are executed in the microprocessor 1 (FIG. 1). FIG. 4 is the flow chart showing a main routine, and FIG. 5 is the flow chart showing an interruption routine.

First, description will be made about an algorithm for realizing synchronous rotation without any position sensor for the rotor.

From the state that the motor is being stopped, three-phase windings are impressed with voltage all together, and forced commutation is carried out (step 101). This driving method is known as the full-wave driving method for the three-phase motor. For example, when three terminals of the motor 3 are defined as "U", "V" and "W", the electrification is carried out sequentially in the following manner:

U→V, W→V, W→U, V→U, V→W and U→W.

The rotor is thus rotated at a speed synchronous with this excitation within an open loop.

For starting up the motor, excitation time periods for respective excitation patterns are kept long enough to start up the motor, and the excitation time periods are gradually shortened, thereby accelerating the rotational speed of the rotor. This is known as the slow-up-driving method. The forced commutation is maintained until an induced voltage can be detected (steps 101 and 102). When the rotational speed of the rotor reaches a predetermined speed, the aforementioned induced voltage is available now.

Figure 3:
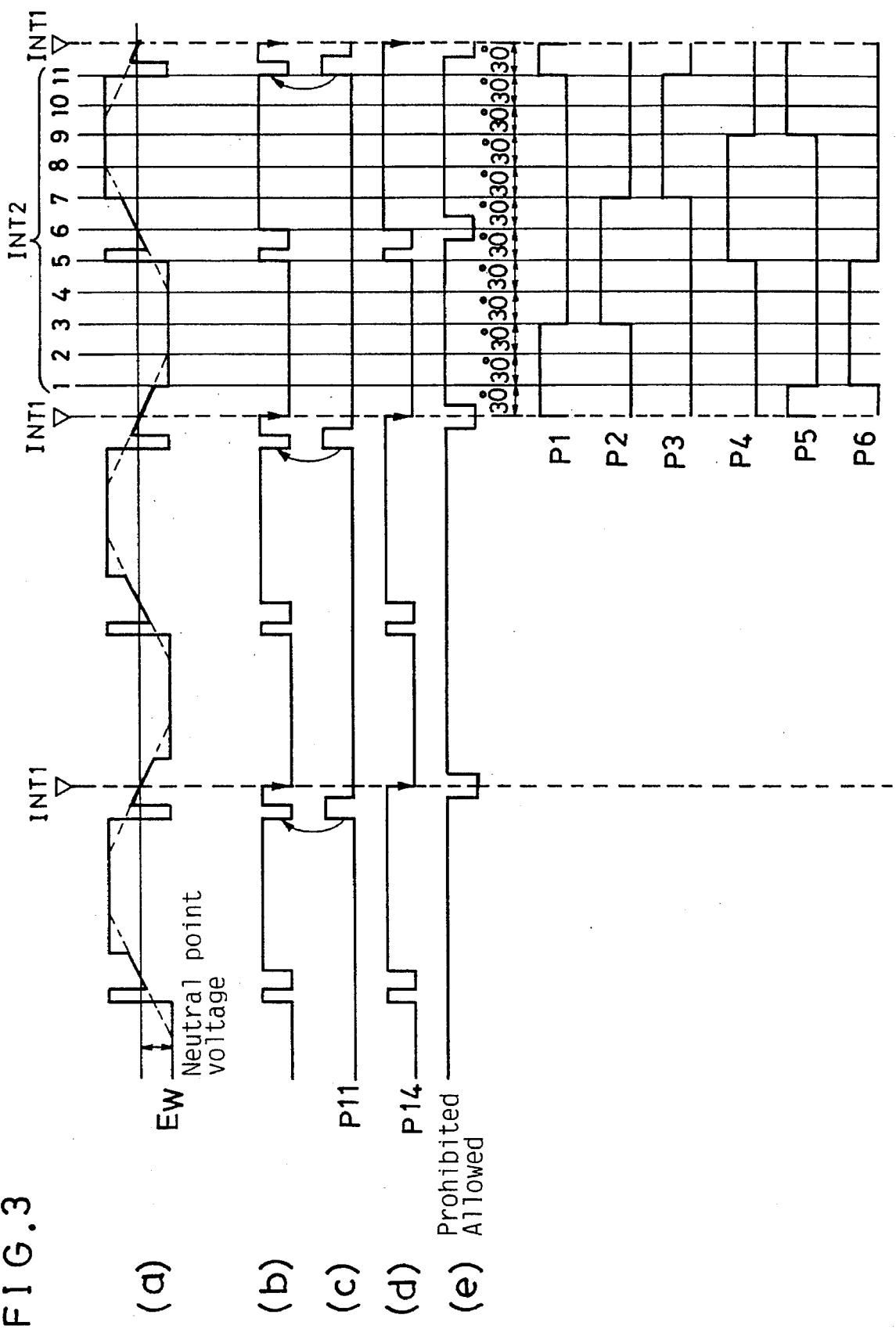
FIG. 3 is a graph showing waveforms in the driving apparatus shown in FIG. 1.

FIG. 3 is a graph showing waveforms on respective portions in FIGS. 1 and 2 after the time when the induced voltage has reached the predetermined value which is enough to be handled in the circuitry. A terminal voltage $E_W$ on one of the excitation coils has a waveform (a). This waveform includes an induced voltage component whose waveform is shown by a dotted line, and this induced voltage component is just information about rotation of the rotor. The signal having the waveform (a) is input to the comparator 4 (FIG. 1). The comparator 4 compares this signal with the neutral point voltage of the motor, and a resultant output is input to the level converter circuit 5 (FIG. 1). An output signal from the level converter circuit 5 has a waveform (b). This waveform (b) contains a cycle and a phase which are the same as the induced voltage included in the terminal voltage $E_W$. Since the waveform (b) is derived by letting the signal pass through the level converter circuit 5 (FIG. 1), the waveform (b) consists of a logic of 0 and 1. The waveform (b) having the phase information is subjected to the below-mentioned processes.

When the induced voltage signal crosses the neutral point voltage, thereby causing the zero-crossing from a plus domain to a minus domain, an external interruption INT1 shown by a triangle mark is to be given to the microprocessor 1 at a fall-down point of the waveform (b). At that time, it should be prohibited that the external interruption is generated at a point other than the zero-crossing point of the induced voltage and the neutral point voltage. In other words, it is necessary to ignore another fall-down of the signal in the waveform (b). For this reason, the following processes are executed:

First, the signal P11 (hardmask pulse) having a waveform (c) is generated by the microprocessor 1 (FIG. 1) to have timely occurred pulses so that the transient voltage due to the switching may be removed. This signal having the waveform (c) joins the signal having the waveform (b) at the OR gate circuit 6 (FIG. 1). Thus, a signal P14 having a waveform (d) is obtained. This signal P14 is inputted to the latch circuit 7 and is latched according to each edge of a clock signal given to the latch circuit 7. This clock signal is the pulse width modulation signal P10 issued from microprocessor 1. The output signal P12 of the latch circuit 7 is input to the microprocessor 1 as an external interruption signal.

Further, to generate the external interruption only at the zero-crossing point of the induced voltage waveform and the neutral point voltage from among all the fall-down edges included in the waveform (d), the microprocessor 1 (FIG. 1) controls to allow or prohibit the external interruption by means of the software of the microprocessor 1 in accordance with the timing shown by a waveform (e). That is, the external interruption is prohibited at a high level region of the waveform (e) and allowed at a low level region of the waveform (e) (step 103). According to this software control of applying the waveform (e) to the waveform (d), the zero-crossing point of the induced voltage signal from plus to minus can be taken out.

Referring to this interruption INT1, commutation timing of the motor is obtained. Excitation is executed in accordance with twelve patterns which are obtained by dividing one cycle (360°) into twelve periods each having an angle of 30°.

When the interruption INT1 is generated, an excitation time period for a motor is set, and a first excitation pattern is issued at the same time. At that time, the timer 14 (FIG. 2) provided in the microprocessor 1 is started (step 202). The excitation time period has a certain value that does not cause the motor to lose the synchronism. At every predetermined excitation time periods, an interruption INT2 is generated by the timer 14. When a first interruption INT2 is generated, step advance is executed in the order of the steps 203, 204, 210, 213 and 203. The excitation signals P1–P6 are thus issued in the step 213. This routine of the steps are repeated as to the subsequent second, third, fourth and fifth interruptions INT2.

Next, lead or lag in phase of the motor is detected on the basis of an induced voltage waveform generated within an off time of excitation. When lead or lag is detected, the excitation time period is corrected by the below-mentioned procedure. After that, the motor is driven with a corrected excitation time period.

Next, method for correcting the excitation time period will be described with reference to FIG. 3 and FIG. 5. When a sixth interruption INT2 is generated by the internal timer 14 (FIG. 2), read-in of a terminal voltage waveform just before the issuance of the excitation pattern is executed (steps 204 and 205). A waveform after completion of the level conversion, i.e., the waveform (d) in FIG. 3, is taken into the latch circuit 7 (FIG. 1). A normal state of phase is detected as a low level just before rising-up, and a lead state of phase is detected as a high level. Normal or lead state of the phase is thus detected. If the lead of phase is detected, the excitation time period is corrected by adjusting its length by a predetermined rate, thereby to eliminate the lead of phase (step 206). Thus, the sixth excitation signal is issued (step 207).

When a predetermined delay time lapses after the issuance of the sixth excitation signal (step 208), read-in of the terminal voltage waveform is executed again (step 209). When the phase is in normal, the high level output is obtained. When the phase is in lag, the low level output is obtained. This information is stored in the memory 16 (FIG. 2).

When a seventh interruption INT2 is generated, the information stored in the memory 16 is read out, and a normal or lag state of the phase is detected. If the lag state is detected, the excitation time period is corrected by adjusting its length by the predetermined rate, thereby to eliminate the lag of phase (step 211), and the seventh excitation signal is issued (step 212).

When the next interruption INT1 is generated, the excitation time period is set again with reference to the interruption INT1, and the first excitation pattern is issued. At every excitation time periods, the interruption INT2 is generated. The excitation signals P1–P6 are thus issued to execute the commutation.

By repeating the above-mentioned processes, the brushless motor rotates with a synchronism.

An ability of phase detection is dependent on an electric angle which corresponds to a predetermined delay time. Sensorless driving is thus carried out in the above-mentioned algorithm.

Detection of a Zero-Crossing Point Under the Speed Control

Next, description will be made about a detection method for the zero-crossing point in case where a pulse-width modulation signal is issued for the speed control. When the pulse-width modulation signal is being issued, the induced voltage appearing during the excitation-off-time gets influence by the pulse-width modulation signal. It is therefore impossible to exactly detect the zero-crossing point of the induced voltage and the neutral point voltage, which is a reference point of the excitation time period, and the phase information about a position of the rotor.

Figure 6:
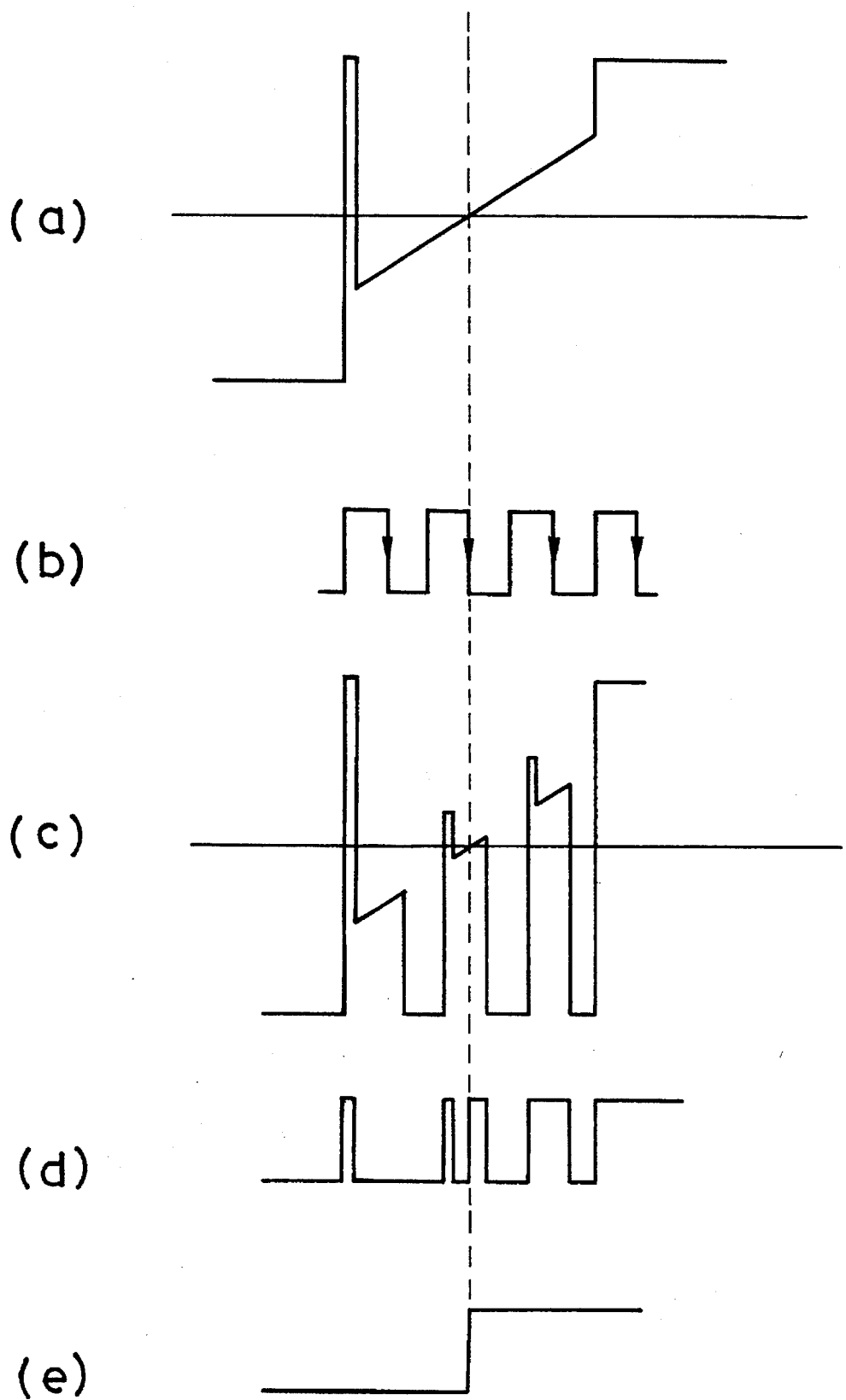
FIG. 6 is a graph showing a processing method of an induced voltage in the present invention.

This phenomenon is shown in FIG. 6. A waveform (a) represents the induced voltage during the excitation-off-time in case the speed control is not provided. A waveform (b) represents the pulse-width modulation signal for the speed control. For the simplicity of illustration, a cycle of the pulse-width modulation signal is drawn in an enlarged scale. Therefore, one cycle of the pulse-width modulation signal is actually shorter than the illustration. A waveform (c) represents the induced voltage appearing during the excitation-off-time in case the speed control is executed. A waveform (d) is obtained by comparing the waveform (c) with the neutral point voltage and converting the level. As is apparent from the waveform (d), the induced voltage within the excitation-off-time gets undesirable influence by the pulse-width modulation signal. Therefore, even if the waveform (d) is taken into the microprocessor 1 (FIG. 1), the zero-crossing point and the phase information are not reliable.

Hereupon, let's pay attention to the waveforms (b) and (c). It is understood that the induced voltage waveform can be taken out without any influence by the pulse-width modulation signal at Just time when the pulse-width modulation signal falls down. Therefore, the phase information having no influence by the pulse-width modulation signal is obtained by latching the induced voltage at a time synchronous with that the pulse-width modulation signal falls down. In this embodiment, the signal P14 (FIG. 1) issued from the OR gate circuit 6 is latched in synchronism with the fall-down of the pulse-width modulation signal P10 given to the latch circuit 7 (FIG. 1) as a clock signal. The output signal P12 of the latch circuit 7 has the waveform (e) in FIG. 6. By utilizing this waveform (e), the zero-crossing point is exactly detected, and thereby the motor rotates stably by referring this zero-crossing point under the phase-locking control. This stable rotation of the motor is realized without any position sensor of the rotor. Then, the motor is impressed with the excitation voltage dependent on a duty of the pulse-width modulation signal.

Description of the Synchronized Rotation

Next, description will be made about a method for synchronously rotating the motor with a predetermined rotational speed commanded. First, the speed control command signal P15 for the rotational speed of the motor is input to the microprocessor 1 (FIG. 1). At that time, a rotational speed of the motor is in proportion to the excitation time period issued from the microprocessor 1. This is because the microprocessor 1 controls the changing over of excitation for the motor, and the microprocessor 1 corrects the excitation time period with reference to the phase information to keep the stable rotation.

Therefore, by observing the excitation time period issued from the microprocessor 1, a rotational speed of the motor is found (step 104 in FIG. 4). A value of the speed control command signal is converted into a value in a time period corresponding to an electric angle of 30°. The converted value is compared with the real speed which is namely the excitation time period issued from the microprocessor 1. Based on a result of the comparison, a duty of the pulse-width modulation signal is varied (step 105), thereby rotating the motor at a rotational speed synchronous with the speed defined by the speed control command signal. In comparing the commanded speed with the real speed, this real speed is given as an average of the some specific excitation time periods from among the excitation time periods set after generation of the interruption INT1.

Description of the Speed Control

Figure 7:
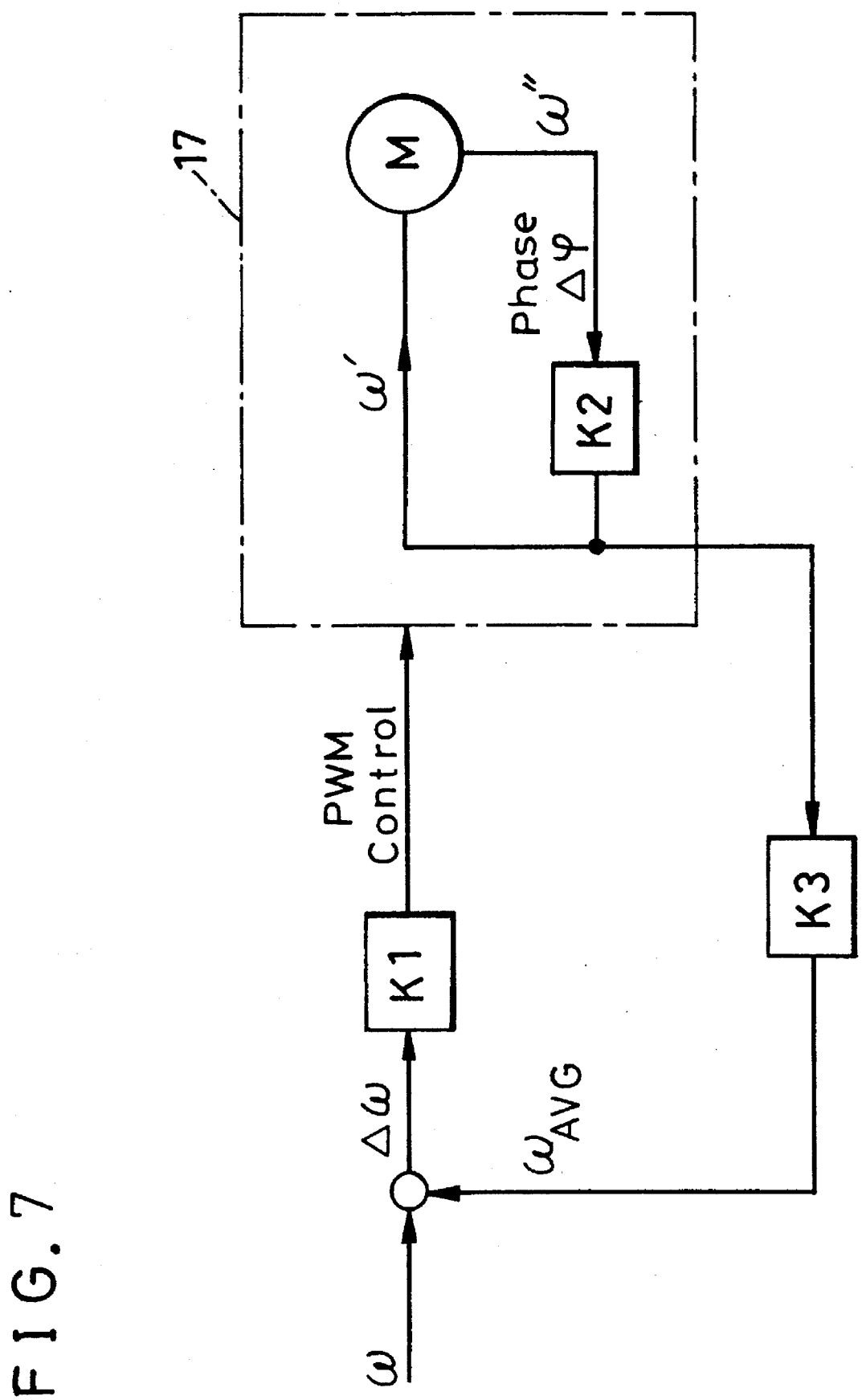
FIG. 7 is a block diagram showing a speed control system in the present invention.

FIG. 7 is a block diagram showing the speed control. A control processing part 17 detects lag or lead of phase $\Delta\phi$ and corrects its rotational speed $\omega''$ to $\omega'$ in order to remove the difference. The rotational speed is an average in predetermined times, and a difference $\Delta\omega$ between the average $\omega_{AVG}$ and the commanded speed $\omega$ is obtained. In response to this difference, a duty of the pulse-width modulation signal is varied. The motor is rotated with a set duty, and the rotational speed $\omega'$ is corrected on the basis of the position information so that stable rotation can be obtained.

By repeating these sequential procedure, the difference $\Delta\omega$ comes close to 0, thereby making a rotation synchronous with the commanded speed. The information about a rotational speed used for explaining the diagram of FIG. 7 corresponds to a time of electric angle of 30°. In the above-mentioned embodiment, although the speed control command signal is converted into the time of an electric angle of 30°, the reverse conversion is also possible.

Supplemental Description

Apart from the above-mentioned embodiment in which the present invention is applied to the three-phase full-wave driving type brushless motor, another embodiment may be such that the present invention is applied to the two(or more)-phase half-wave or full-wave driving type sensorless brushless motor.

Also, although the induced voltage is measured from only one exciting coil in the above-mentioned embodiment, it can be measured from two or more exciting coils.

Although change of the excitation is executed with reference to the position where the induced voltage waveform of W-phase crosses the neutral point voltage from plus to minus in the above-mentioned embodiment, it is also possible in the three-phase brushless motor to execute the change of excitation by making a reference on the position where the induced voltage waveform of U-phase or V-phase crosses the neutral point voltage.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A driving apparatus for a sensorless brushless motor, comprising:

a microprocessor;

drive means for driving said motor in accordance with an excitation signal issued from the microprocessor;

speed control means for controlling a speed of said motor by pulse-width modulating the excitation signal;

latch means for latching a converted signal representative of an induced voltage appearing on a coil of said motor in comparison with a neutral point voltage of said motor, the latch means latching the converted signal according to a pulse width modulation signal issued from the microprocessor; and correction means for correcting an excitation time period of said excitation signal by referring to the latched converted signal.

2. A driving apparatus for a sensorless brushless motor in accordance with claim 1, further comprising pulse-width modulation means for modulating said pulse-width by comparing a signal corresponding to a real rotational speed of said motor issued from said microprocessor with a speed control command signal.

3. A driving apparatus for a sensorless brushless motor in accordance with claim 2, further comprising means for measuring said real rotational speed by using an average of plural excitation time periods of said excitation signal for said motor.

4. A driving apparatus in accordance with claim 1, wherein said latch means comprises a comparator, a level converter circuit, an OR gate circuit and a latch circuit.

\* \* \* \* \*